United States Patent

Tuggle et al.

[15] 3,638,796
[45] Feb. 1, 1972

[54] APPARATUS FOR PREVENTING OIL POLLUTION

[72] Inventors: Ray Tuggle; Richard H. Graves, both of Houston, Tex.; Ray J. De Rouen, New Iberia, La.

[73] Assignee: Texaco Inc., New York, N.Y.

[22] Filed: Dec. 31, 1968

[21] Appl. No.: 816,876

[52] U.S. Cl. ............................210/170, 210/250, 210/519
[51] Int. Cl. ..................................................B01d 21/24
[58] Field of Search.....................210/83, 84, 241, 242, 250, 210/170, 519

[56] References Cited

UNITED STATES PATENTS

| 698,569 | 4/1902 | Sleezer | 210/250 X |
| 1,537,590 | 5/1925 | Goldman | 210/250 |
| 1,955,064 | 4/1934 | Hawley | 210/83 X |
| 2,636,609 | 4/1953 | Blanchet | 210/170 |
| 3,314,540 | 4/1967 | Lane | 210/242 X |
| 3,447,683 | 6/1969 | Luce, Jr. | 210/83 |

*Primary Examiner*—John Adee
*Attorney*—K. E. Kavanagh and Thomas H. Whaley

[57] ABSTRACT

An oil pollution control apparatus that isolates a portion of a substantial body of water. The portion isolated extends from above the surface to near the bottom of the body of water. A structural example is a vertical caisson with its base extending into the bottom of the body of water and with openings just above that bottom to permit circulation of the water at that level.

5 Claims, 2 Drawing Figures

PATENTED FEB 1 1972  3,638,796

APPARATUS FOR PREVENTING OIL POLLUTION

BACKGROUND OF THE INVENTION

1. Field of the Invention

This invention relates to apparatus applicable to anti-water-pollution, generally. More specifically, the invention concerns a manner of confining an effluent containing oil or other light fluids separated from a body of water insofar as the oil is concerned.

2. Description of the Prior Art

While the basic principles involved in separating oil and water by means of allowing gravity separation in a container are well known per se, this invention teaches a particular application of these principles in a novel and beneficial manner that is beyond the level of what would be expected from one skilled in the art. Thus, various structures are known to the art involving tanks with particular arrangements for permitting separation of oil and water and with structure for drawing off either or both of the separated constituents of the mixture. Furthermore, it is known to apply such concept to a floating barge that is adapted for receiving waste fuel discharge from a ship, or the like. All such prior art teachings, however, fail to suggest permanent type of structure that is applicable specifically to petroleum producing operations located on inland or offshore waters.

SUMMARY OF THE INVENTION

Briefly, the invention concerns apparatus for preventing oil pollution in a large body of water that has a surface and a subsurface. Said apparatus comprises in combination a caisson or the like situated in an upright position and extending from above the surface of said body of water. Said caisson reaches into the subsurface of said body of water. The apparatus also comprises means for connecting said body of water with the interior of said caisson only at a depth near the said subsurface.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENTS

Figure 1:
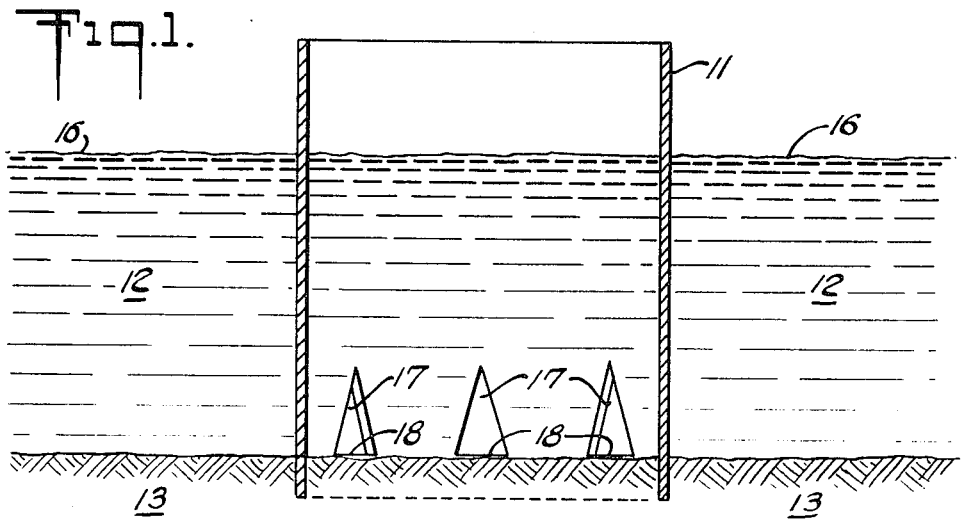
FIG. 1 is a longitudinal cross-sectional schematic illustrating one form of caisson according to the invention, that is set into the subsurface of a body of water.

Referring to FIG. 1 of the drawings, it will be observed that the structure illustrated simply includes a caisson 11 that may be constructed with a feasible geometrical shape in cross section, e.g., circular or any other enclosed geometrical design such as octagonal or square or the like. It will be observed that the caisson 11 is situated in a body of water 12 that has a bottom or subsurface 13. The bottom 13 is ordinarily covered with some relatively soft sedimentary layer or layers and consequently the caisson 11 sinks into such bottom 13 a short distance. The location of the caisson may be fixed against shifting, if desired, by using piling (not shown) or the like.

The body of water 12 has a surface layer 16. It is illustrated as being indefinite in lateral extent since this invention is particularly applicable to the problem of oil pollution in open bodies of water. If the body of water 12 is tidal in nature, there will be variations in the level of the surface 16. In such case, the caisson 11 must be constructed so as to extend well above the highest level of the surface 16 that might be encountered. In any event, the height of the caisson above the surface at any given time must be sufficient to prevent maximum wave action from causing the fluid inside the caisson from mixing with the body of water outside thereof, over the top.

The caisson 11 includes a plurality of openings 17 near the bottom thereof. These are preferably situated so that when the caisson is placed firmly embedded into the bottom 13, lower edges 18 of the openings 17 will be about at the level of the subsurface 13 where it has the body of water in contact therewith. These openings 17 are illustrated in FIG. 1 as being triangular in shape. But, it is to be noted that they might take various other geometrical configurations, or even that the caisson might be open at the bottom as indicated in FIG. 2.

Figure 2:
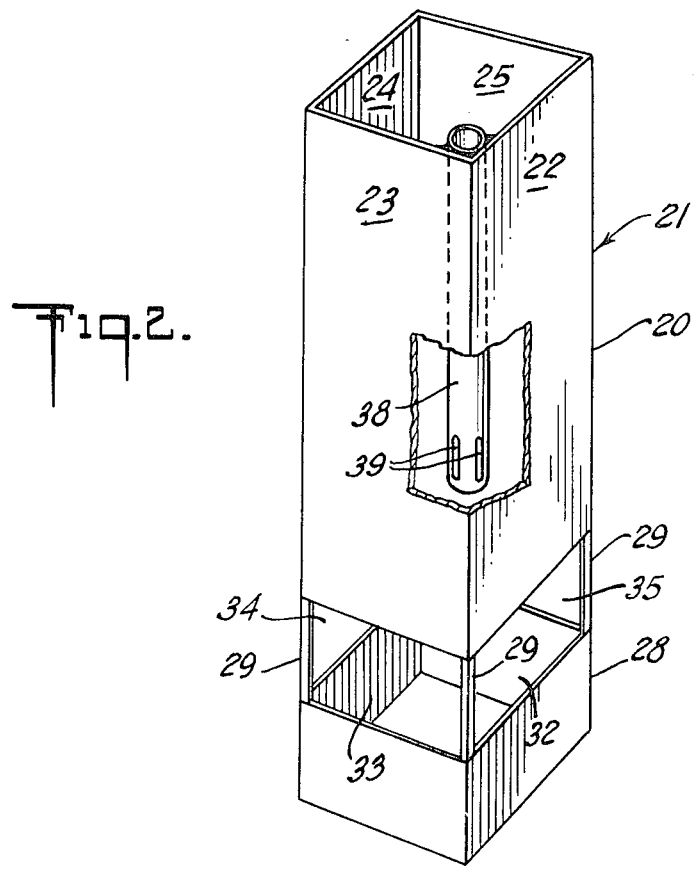
FIG. 2 is a schematic perspective partly broken away to show some interior structure and illustrating another form of caisson according to the invention.

FIG. 2 illustrates a modification of the structure that may be employed in a caisson according to the invention. There is a square cross section caisson 21 that has an upper tubular body portion 20 which comprises four side panels 22–25 joined in a fluidtight manner at the edges. This forms an impervious enclosure that is open at the top and bottom.

Below the body 20 there is a base 28 that is joined with the upper body 20 by four braces or legs 29, one located at each corner. When the caisson 21 is in place in a body of water, the base 28 will sink into the bottom or subsurface thereof in a manner similar to that described above in connection with the circular caisson 11.

There are four openings 32–35 thus formed between the four braces 29. These openings correspond to the openings 17 of caisson 11. They permit free circulation of water from the body of water into the interior of upper body 20 through the open bottom of the body 20.

There is a pipe 38 that is attached into one corner of the upper body 20. The top of pipe 38 is open and it is mounted flush with the top edges of the panels 22 and 23. It may, of course, be fastened in any feasible manner, e.g., by being welded in place as is indicated in the drawing.

The pipe 38 is for receiving the input fluid that may contain some oil which would become a source of pollution for the body of water. The bottom of the pipe 38 is preferably closed with a plurality of slots 39 in the sides near the bottom to let the input fluid flow out into the interior of the caisson 21 with a generally horizontal direction of flow. The size and length of the pipe 38 are related to the size of the caisson, of course, and also to the quantity of input fluid to be handled. The slots 39 are located far enough above the opening at the bottom of the panels 22–25 to be sure that the oil separation will take place without any oil being carried out into the body of water before it rises to the top of the fluid enclosed or contained in the top of the caisson 21. It will be appreciated that interior baffles (not shown) might be employed in any desired manner to aid in accomplishing the foregoing.

The basically simple structure as illustrated in the drawings has the beneficial attribute of being adaptable to various arrangements, such as by being incorporated as a structural element in an oil well or production platform. Thus, it could be that a leg of such platform might be hollow and in any event it would extend from above the surface of the body of water to beneath the bottom thereof. Therefore this invention could be incorporated therein.

It will be observed that this invention provides a useful but inexpensive manner of avoiding completely any oil pollution in open bodies of water. It has the great attribute of being applicable to structures normally provided already but with a very minimum of modification. Furthermore, as already noted above, it applies the basic concept of separation of fluids that is a natural phenomenon and this results in a very reliable and effective result.

The caisson employed may be constructed of any feasible material for a particular installation. It is important to use such materials as required for providing long-term operation, and material or materials which will withstand associated environmental and weight conditions. It may be preferable to use steel for one or more caissons provided some protection against corrosion is employed. Thus, a protective system consisting of coatings, e.g., zinc-rich paints, enamels or mastics, baked on or air-dried epoxies might be employed. Also, cathodic protection might be used.

While particle embodiments of the invention have been described above in considerable detail, in accordance with the applicable statutes, this is not to be taken as in any way limiting the invention but merely as being descriptive thereof.

We claim:

1. Apparatus for preventing oil pollution in a large body of water having a surface and a bottom therefor, comprising in combination
   a caisson situated in an upright position and extending from above the surface of said body of water,
   said caisson reaching into the bottom beneath said body of water, and
   means for connecting said body of water with the interior of said caisson only at a depth near the said bottom.

2. Apparatus according to claim 1 wherein said means for connecting comprises a plurality of openings through the walls of said caisson at a depth near said bottom.

3. Apparatus according to claim 2 wherein said caisson includes a plurality of legs extending downward from the lower edges thereof, and
   wherein said plurality of openings comprise the spaces between said legs.

4. Apparatus according to claim 3 further including means for introducing fluid mixture into the interior of said caisson in a horizontal direction to avoid escape of any oil through said openings.

5. Apparatus for preventing oil pollution in a large body of water having a surface and a subsurface, comprising in combination
   a caisson situated in an upright position,
   said caisson extending above the highest level of said surface an amount sufficient to prevent maximum wave action from causing mixing of the fluid inside with said body of water over the top of the caisson,
   said caisson having a plurality of legs extending downward and reaching into the said subsurface,
   a plurality of openings from the inside of said caisson to said body of water being formed by the spaces between said legs,
   a pipe attached vertically into a corner inside of said caisson,
   said pipe having a closed bottom, and
   said pipe having a plurality of slots through the sides thereof near the bottom for directing the flow of input fluid in a generally horizontal direction,
   said closed bottom being located above aid openings far enough to ensure separation of oil without any escape through the openings.

* * * * *